(12) United States Patent
Frenz

(10) Patent No.: US 9,860,697 B2
(45) Date of Patent: *Jan. 2, 2018

(54) METHODS AND SYSTEMS FOR AUTOMATIC ADJUSTMENT OF A GEOFENCE SIZE

(71) Applicant: Honeywell International Inc., Morris Plains, NJ (US)

(72) Inventor: Jonathan Paul Frenz, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,264

(22) Filed: Dec. 9, 2015

(65) Prior Publication Data

US 2017/0171704 A1 Jun. 15, 2017

(51) Int. Cl.
*H04W 4/02* (2009.01)

(52) U.S. Cl.
CPC .................... *H04W 4/021* (2013.01)

(58) Field of Classification Search
CPC ..................................... H04W 4/021
See application file for complete search history.

(56) References Cited

U.S. PATENT DOCUMENTS

| | | |
|---|---|---|
| 6,255,988 B1 | 7/2001 | Bischoff |
| 6,356,282 B2 | 3/2002 | Roytman et al. |
| 6,400,956 B1 | 6/2002 | Richton |
| 6,478,233 B1 | 11/2002 | Shah |
| 6,529,137 B1 | 3/2003 | Roe |
| 6,604,023 B1 | 8/2003 | Brown et al. |
| 6,665,613 B2 | 12/2003 | Duvall |

(Continued)

FOREIGN PATENT DOCUMENTS

| | | |
|---|---|---|
| AU | 2015201441 A1 | 10/2015 |
| CN | 101689327 | 5/2013 |

(Continued)

OTHER PUBLICATIONS

U.S. Appl. No. 15/048,902, filed Feb. 19, 2016.

(Continued)

*Primary Examiner* — Asghar Bilgrami
(74) *Attorney, Agent, or Firm* — Seager, Tufte & Wickhem, LLP

(57) ABSTRACT

A mobile device with a display and location services may store information pertaining to a geofence. With the aid of the location services of the mobile device, a geofence crossing may be detected when the mobile device crosses the stored geofence and, if a geofence crossing is detected, the mobile device may transmit a corresponding geofence crossing event to a remote location via a transmitter of the mobile device. The size of the geofence may be automatically adjusted when a predetermined abnormality is suspected in the detected geofence crossing events. In some cases, a query is provided to the user to verify the presence of the predetermined abnormality before the size of the geofence is automatically adjusted, or a user-initiated menu may be employed to verify the presence of the predetermined abnormality and/or to adjust the size of the geofence.

20 Claims, 12 Drawing Sheets

(56) References Cited

U.S. PATENT DOCUMENTS

| | | |
|---|---|---|
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,614,567 B2 | 11/2009 | Chapman et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,064,935 B2 | 11/2011 | Shamoon et al. |
| 8,065,342 B1 | 11/2011 | Borg et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,301,765 B2 | 10/2012 | Goodman |
| 8,332,055 B2 | 12/2012 | Veillette |
| 8,350,697 B2 | 1/2013 | Trundle et al. |
| 8,386,082 B2 | 2/2013 | Oswald |
| 8,390,473 B2 | 3/2013 | Kryzanowski et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,531,294 B2 | 9/2013 | Slavin et al. |
| 8,554,374 B2 | 10/2013 | Lunacek et al. |
| 8,554,714 B2 | 10/2013 | Raymond et al. |
| 8,571,518 B2 | 10/2013 | Imes et al. |
| 8,587,445 B2 | 11/2013 | Rockwell |
| 8,626,344 B2 | 1/2014 | Imes et al. |
| 8,630,741 B1 | 1/2014 | Matsuoka et al. |
| 8,648,706 B2 | 2/2014 | Ranjun et al. |
| 8,670,783 B2 | 3/2014 | Klein |
| 8,718,826 B2 | 5/2014 | Ramachandran et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 8,965,406 B2 | 2/2015 | Henderson |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,215,560 B2 | 12/2015 | Jernigan |
| 9,219,983 B2 | 12/2015 | Sheshadri et al. |
| 9,247,378 B2 | 1/2016 | Bisson et al. |
| 9,288,620 B2 | 3/2016 | Menendez |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,722 B2* | 6/2016 | Burks ............... H04W 52/383 |
| 9,363,772 B2* | 6/2016 | Burks ............... H04W 52/383 |
| 9,414,422 B2 | 8/2016 | Belghoul et al. |
| 9,433,681 B2 | 9/2016 | Constien et al. |
| 9,449,491 B2 | 9/2016 | Sager et al. |
| 9,589,435 B2 | 3/2017 | Finlow-Bates |
| 9,635,500 B1 | 4/2017 | Becker et al. |
| 2002/0147006 A1 | 10/2002 | Coon et al. |
| 2005/0172056 A1 | 8/2005 | Ahn |
| 2006/0063522 A1 | 3/2006 | McFarland |
| 2006/0097063 A1 | 5/2006 | Zeevi |
| 2007/0037605 A1 | 2/2007 | Logan |
| 2007/0099626 A1 | 5/2007 | Lawrence et al. |
| 2007/0114295 A1 | 5/2007 | Jenkins |
| 2007/0249319 A1 | 10/2007 | Faulkner et al. |
| 2008/0094230 A1 | 4/2008 | Mock et al. |
| 2010/0034386 A1 | 2/2010 | Choong et al. |
| 2010/0042940 A1 | 2/2010 | Monday et al. |
| 2010/0081375 A1 | 4/2010 | Rosenblatt et al. |
| 2010/0127854 A1 | 5/2010 | Helvick et al. |
| 2010/0156628 A1 | 6/2010 | Ainsbury et al. |
| 2010/0261465 A1 | 10/2010 | Rhoads et al. |
| 2011/0153525 A1 | 6/2011 | Benco et al. |
| 2012/0172027 A1* | 7/2012 | Partheesh ............ H04W 4/021 455/420 |
| 2012/0191257 A1 | 7/2012 | Corcoran et al. |
| 2012/0209730 A1 | 8/2012 | Garrett |
| 2012/0259466 A1 | 10/2012 | Ray et al. |
| 2012/0284769 A1 | 11/2012 | Dixon et al. |
| 2013/0073094 A1 | 3/2013 | Knapton et al. |
| 2013/0099977 A1* | 4/2013 | Sheshadri ............ H04W 4/022 342/450 |
| 2013/0204441 A1 | 8/2013 | Sloo et al. |
| 2013/0225196 A1 | 8/2013 | James et al. |
| 2013/0231137 A1 | 9/2013 | Hugie et al. |
| 2013/0238366 A1* | 9/2013 | Morgan ................ B60R 25/04 705/4 |
| 2013/0310053 A1 | 11/2013 | Srivastava et al. |
| 2013/0318217 A1 | 11/2013 | Imes et al. |
| 2013/0324160 A1* | 12/2013 | Sabatellil ........... H04W 4/022 455/456.3 |
| 2013/0331087 A1 | 12/2013 | Shoemaker et al. |
| 2014/0031989 A1 | 1/2014 | Bergman et al. |
| 2014/0031991 A1 | 1/2014 | Bergman et al. |
| 2014/0156087 A1 | 6/2014 | Amundson |
| 2014/0164118 A1 | 6/2014 | Polachi |
| 2014/0172176 A1 | 6/2014 | Deilmann et al. |
| 2014/0200718 A1 | 7/2014 | Tessier |
| 2014/0244048 A1 | 8/2014 | Ramachandran et al. |
| 2014/0266635 A1 | 9/2014 | Roth et al. |
| 2014/0277762 A1 | 9/2014 | Drew |
| 2014/0302879 A1 | 10/2014 | Kim et al. |
| 2014/0330435 A1 | 11/2014 | Stoner et al. |
| 2014/0337123 A1 | 11/2014 | Neurenberg et al. |
| 2014/0349672 A1 | 11/2014 | Kern et al. |
| 2014/0370911 A1 | 12/2014 | Gorgenyi et al. |
| 2015/0065161 A1 | 3/2015 | Ganesh et al. |
| 2015/0094860 A1 | 4/2015 | Finnerty et al. |
| 2015/0140994 A1 | 5/2015 | Partheesh et al. |
| 2015/0141045 A1 | 5/2015 | Qiu et al. |
| 2015/0159895 A1 | 6/2015 | Quam et al. |
| 2015/0163631 A1 | 6/2015 | Quam et al. |
| 2015/0163945 A1 | 6/2015 | Barton et al. |
| 2015/0186497 A1* | 7/2015 | Patton ............... G06F 17/30598 707/740 |
| 2015/0237470 A1 | 8/2015 | Mayor et al. |

(56) References Cited

U.S. PATENT DOCUMENTS

| | | | |
|---|---|---|---|
| 2015/0271638 A1 | 9/2015 | Menayas et al. | |
| 2015/0301543 A1 | 10/2015 | Janoso et al. | |
| 2016/0007156 A1 | 1/2016 | Chiou et al. | |
| 2016/0057572 A1* | 2/2016 | Bojorquez Alfaro . | H04W 4/021 455/411 |
| 2016/0142872 A1 | 5/2016 | Nicholson et al. | |
| 2016/0223998 A1 | 8/2016 | Songkakul et al. | |
| 2017/0026506 A1 | 1/2017 | Haepp et al. | |

FOREIGN PATENT DOCUMENTS

| | | |
|---|---|---|
| DE | 102013226390 A1 | 6/2015 |
| EP | 1515289 | 3/2005 |
| EP | 2607802 EP | 6/2013 |
| EP | 2675195 A2 | 12/2013 |
| MX | 2012000906 | 9/2012 |
| WO | WO 2009/034720 | 3/2009 |
| WO | WO 2009/036764 | 3/2009 |
| WO | WO 2009/067251 | 5/2009 |
| WO | WO 2011/011404 | 1/2011 |
| WO | 2011121299 A1 | 10/2011 |
| WO | WO 2012/000107 | 1/2012 |
| WO | 2012068517 A1 | 5/2012 |
| WO | WO 2013/170791 | 11/2013 |
| WO | WO 2014/016705 | 1/2014 |
| WO | WO 2014/047501 | 3/2014 |
| WO | WO 2014/144323 | 9/2014 |
| WO | 2014200524 A2 | 12/2014 |
| WO | WO 2014/197320 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

Balaji et al., "Sentinel: Occupancy Based HVAC Actuation Using Existing WiFi Infrastructure Within Commercial Buildings," SenSys '13, 14 pages, Nov. 11-15, 2015.
"Petition for Inter Partes Review of U.S. Pat. No. 8,571,518 Pursuant to 35 U.S.C. 311-319, 37 CFR 42," Inventor Imes et al., dated Oct. 29, 2014.
Do, "Programmable Communicating Thermostats for Demand Response in California," DR ETD Workshop, 26 pages, Jun. 11, 2007.
Green, "PM's Thermostat Guide," Popular Mechanics, pp. 155-158, Oct. 1985.
Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive GPS-Controlled Thermostat System," 89 pages, Sep. 2008.
http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.
http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.
http://www.allure-energy.com/aenf_jan9_12.html, "CES Gets First Look at EverSense," Allure Energy, 2 pages, printed Feb. 17, 2015.
http://IWww.pmev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.
Mobile Integrated Solutions, LLC, "MobiLinc Take Control of Your Home, MobiLinc and Geo-Fence Awareness," 9 pages, downloaded Mar. 27, 2015.
Pan et al., "A Framework for Smart Location-Based Automated Energy Controls in a Green Building Testbed," 6 pages, downloaded Jan. 30, 2015.
SmartThings Inc., "2 Ecobee Si Thermostat +Geofencing," 17 pages, downloaded Nov. 3, 2014.
U.S. Appl. No. 14/640,984, filed Mar. 6, 2015.
U.S. Appl. No. 14/668,800, filed Mar. 25, 2015.
U.S. Appl. No. 14/696,662, filed Apr. 27, 2015.
U.S. Appl. No. 14/696,725, filed Apr. 27, 2015.
U.S. Appl. No. 14/933,948, filed Nov. 5, 2015.
U.S. Appl. No. 14/938,595, filed Nov. 11, 2015.
U.S. Appl. No. 14/934,543, filed Nov. 6, 2015.
U.S. Appl. No. 14/938,642, filed Nov. 11, 2015.
U.S. Appl. No. 14/964,349, filed Dec. 9, 2015.
Extended European Search Report and Opinion for EP Application No. 16156760.7-1862, dated Jul. 8, 2016.
Extended European Search Report for EP Application No. 1619416, dated Feb. 2, 2017.
Extended European Search Report for EP Application No. 16196128.9, dated Mar. 7, 2017.
Gentec, "Feature Focus, Threat Level Management," 2 pages, 2013.
Allure Energy, "Our Technology," http://www.allure-energy.com/pages/about.jsp 1 page, printed May 30, 2012.
Extended European Search Report for EP Application No. 16195639.6, dated May 31, 2017.
International Search Report for PCT Application No. PCT/US2010/042589 dated Nov. 22, 2010.
Mozer, "The Neural Network House: An Environment that Adapts to Its Inhabitants," Department of Computer Science, University of Colorado, 5 pages, downloaded May 29, 2012.

* cited by examiner

| Trigger | Device Token | Phone Timestamp | Phone Direction | Server 1 Timestamp | Server 1 Received | Server 1 Direction | Server 1 ->Server 2 | Server 2 -> STAT |
|---|---|---|---|---|---|---|---|---|
| FenceCrossed | 1bdb72ba4b | 8/30/2015 9:47:22 PM | Depart | 8/30/2015 9:47:23 PM | 8/30/2015 9:47:23 PM | Depart | ✓ | ✓ |
| FenceCrossed | 1bdb78ba4c | 8/30/2015 9:46:21 PM | Arrive | 8/30/2015 9:46:22 PM | 8/30/2015 9:46:27 PM | Arrive | ✓ | ✗ |
| FenceCrossed | 1bdb81ba6a | 8/30/2015 9:35:51 PM | Depart | 8/30/2015 9:35:52 PM | 8/30/2015 9:36:46 PM | Depart | ✓ | ✓ |
| FenceCrossed | 1bdb91ba4x | 8/30/2015 9:25:51 PM | Arrive | 8/30/2015 9:25:52 PM | 8/30/2015 9:26:48 PM | Arrive | ✓ | ✗ |
| FenceCrossed | 1bdb72ca3c | 8/30/2015 9:20:23 PM | Depart | 8/30/2015 9:20:24 PM | 8/30/2015 9:20:35 PM | Depart | ✓ | ✓ |
| FenceCrossed | 1bdb72aa4d | 8/30/2015 9:19:12 PM | Arrive | 8/30/2015 9:19:12 PM | 8/30/2015 9:20:20 PM | Arrive | ✓ | ✗ |

FIG. 6

Geofencing troubleshooting

Have you noticed that geofence events are triggering while you remain at home?

Yes | No

FIG. 8

METHODS AND SYSTEMS FOR AUTOMATIC ADJUSTMENT OF A GEOFENCE SIZE

TECHNICAL FIELD

The disclosure relates generally to building automation, and more particularly to building automation systems with geofencing capabilities.

BACKGROUND

Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. For example, when the building automation system includes an HVAC system, the building automation system may set a temperature set point of the HVAC system to a more energy efficient setting when in an unoccupied mode and a more comfortable setting when in an occupied mode. In another example, when the building automation system includes a security system, the building automation system may set the security system to a locked or away state when in an unoccupied mode and an unlocked or home state when in an occupied mode.

SUMMARY

The present disclosure pertains generally to geofencing and, more particularly, to improvements in the accuracy and robustness of geofencing. An example of the disclosure may be found in a mobile device with a display and location services. The mobile device may store information pertaining to a geofence. With the aid of the location services of the mobile device, a geofence crossing may be detected when the mobile device crosses the geofence, and if a geofence crossing is detected, the mobile device may transmit a geofence crossing event to a remote location via a transmitter of the mobile device. The size of the geofence may be automatically adjusted if a predetermined abnormality is suspected in the detected geofence crossing events. The geofence crossing events may be analyzed by the mobile device, a remote server and/or other device to determine if a predetermined abnormality is suspected. In some cases, a query may be provide to the user to verify the presence of the predetermined abnormality before the size of the geofence is automatically adjusted. In some instances, such functionality may be programmed into the mobile device by an executable program stored on a non-transitory computer-readable storage medium.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

FIG. 6 shows an illustrative geofence crossing event log that corresponds to a particular mobile device;

FIG. 8 is an illustrative query that may be displayed on the mobile device soliciting information from the user of the mobile device regarding a suspected predetermined abnormality in the detected geofence crossing events;

DESCRIPTION

Figure 1:
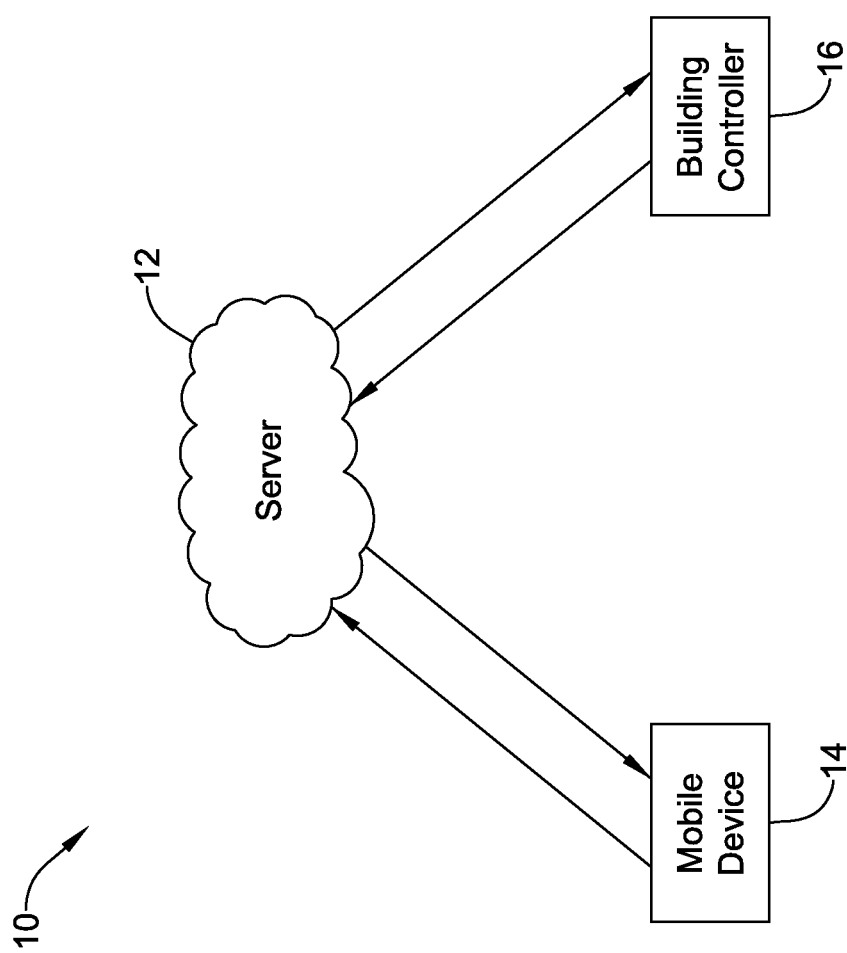
FIG. 1 is a schematic view of an illustrative building automation system.

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

A building automation system may include a controller, computer and/or other processing equipment that is configured to control one or more features, functions, systems or sub-systems of a building. In some cases, devices that can be used by individuals to communicate with the controller, computer and/or other processing equipment. In some cases, a building automation system may include a plurality of components that, in combination, perform or otherwise provide the functionality of the building automation system. A building automation system may be fully contained within a single building, or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic view of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network and/or any other suitable network. Likewise, it is contemplated that the building controller 16 may communicate with the server 12 at least partially through a network such as the Internet, sometimes using a cell phone network, WiFi network and/or any other suitable network. In some cases, the mobile device 14 may be a smartphone, a smart watch, a smart ring, a tablet computer, a laptop computer and/or any other suitable device.

Figure 2:
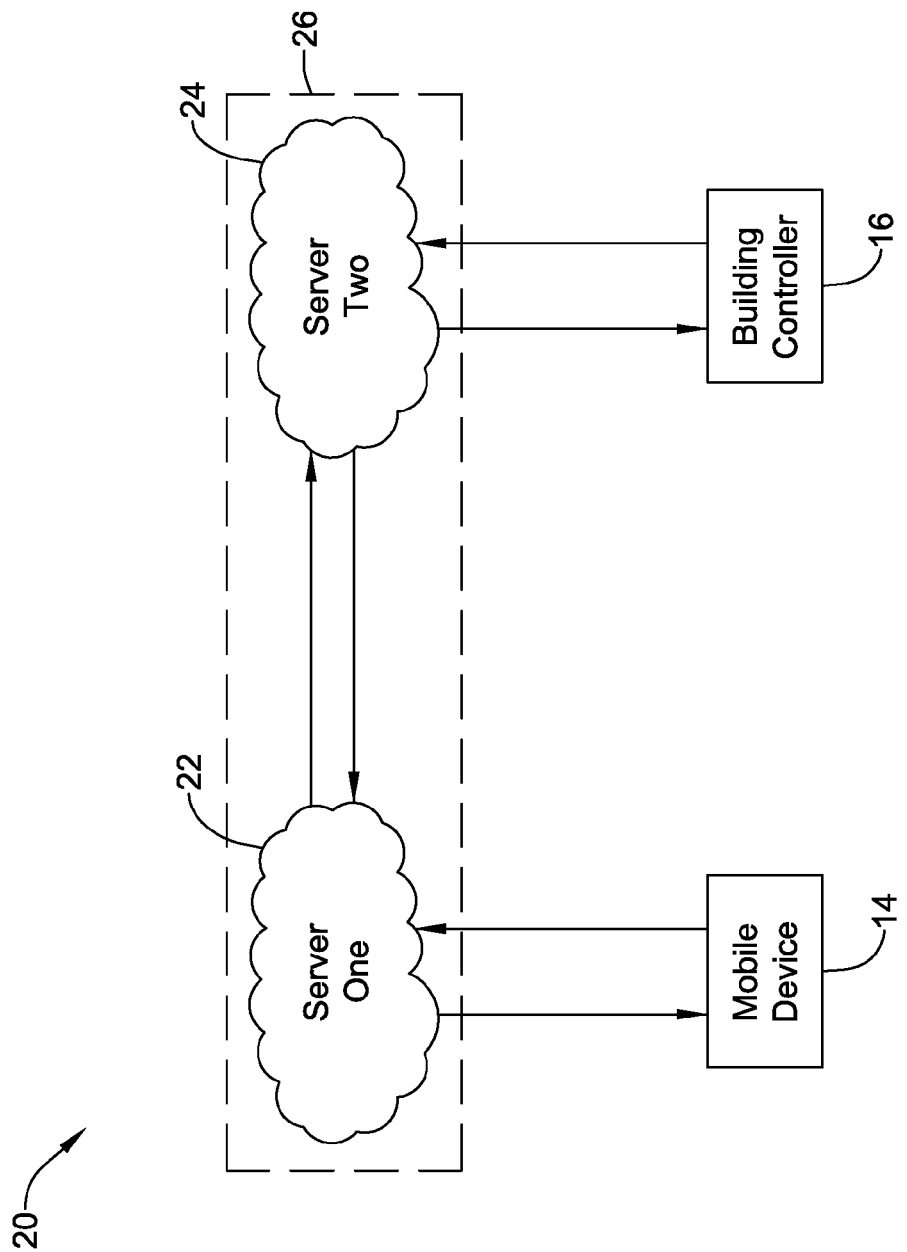
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to receive data from the first server 22 and/or the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other. In some cases, each of the first server 22 and the second server 24 may perform a defined function.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
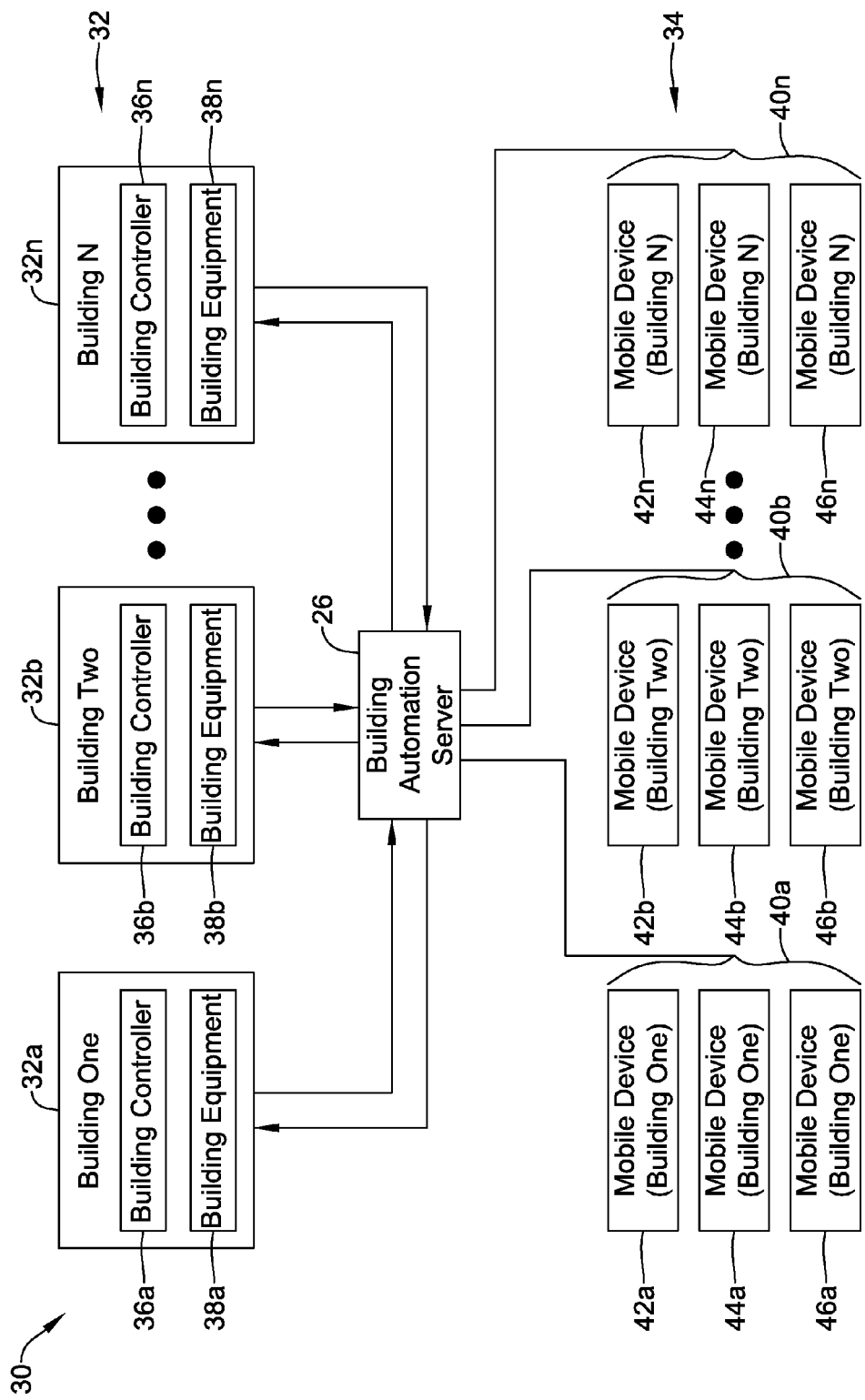
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26. In some cases, each building may be associated with a unique customer account, as further described below.

As illustrated, each of the plurality of buildings 32 includes a building controller and one or more pieces of building equipment. The building equipment may, for example, be HVAC equipment, security equipment, lighting equipment, fire suppression equipment, and/or the like. In particular, the building 32A includes a building controller 36A and building equipment 38A, the building 32B includes a building controller 36B and building equipment 38B, and so on through the building 32N, which includes a building controller 36N and building equipment 38N. It will be appreciated that while each building is illustrated as having a single building controller and single building equipment controlled by the single building controller, in some cases a building may have multiple related or unrelated building controllers and/or multiple pieces of related or unrelated building equipment.

The plurality of mobile devices 34 may be considered as being divided into a set of mobile devices each associated with a corresponding building. In the example shown, the plurality of mobile devices 34 may be considered as being divided into a set of mobile devices 40A that are associated with the building 32A, a set of mobile devices 40B that are associated with the building 32B, and so on through a set of mobile devices 40N that are associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices such as smartphones or tablets may be associated with a particular building, as desired. Each user or occupant of a building may have an associated mobile device or may have several associated mobile devices. In some cases, a user or occupant may have a mobile device associated with several different locations such as a home, a cabin or a place of work.

Associating a mobile device with a particular building generally involves the individual who uses the particular mobile device. In the example shown in FIG. 3, a mobile device can communicate with the building automation server 26 and may cause the building automation server 26 to provide instructions to the building controller that is associated with the particular mobile device. For example and in some instances, a mobile phone with location services activated can be used to inform the building automation server 26 as to the whereabouts of the user relative to a geofence defined for the associated building and, in some cases, an estimate of how long before the user will arrive at the associated building. The building automation server 26 may send a command to the building controller of the associated building to operate the building equipment in an energy savings manner when all of the users that are associated with a particular building are determined to be away from the building (e.g. the building is unoccupied). The building automation server 26 may send a command to the building controller of the associated building to operate the building equipment in a comfort mode when all of the users that are associated with a particular building are determined or deemed not to be away from the building (e.g. the building is occupied).

Figure 4:
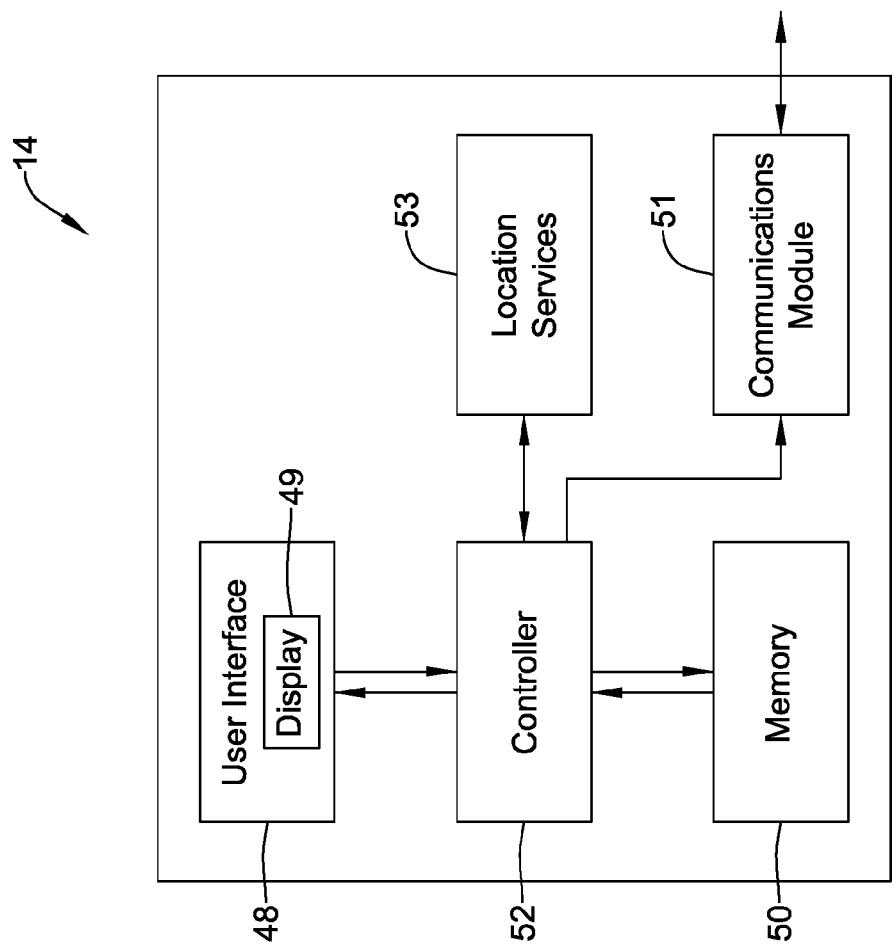
FIG. 4 is a schematic view of an illustrative mobile device.

FIG. 4 is a schematic diagram of the illustrative mobile device 14, as previously referenced in FIGS. 1 and 2. The illustrative mobile device 14 has location services 53 for determining a location of the mobile device 14 and includes a user interface 48 with a display 49, a memory 50, an communications module 51, and a controller 52 that is operably coupled to the user interface 48, the memory 50 and the communications module 51. The location services 53 may include, for example, cellular triangulation (CT), Global Position System (GPS), WiFi Based Positioning (WPS), and/or any other suitable location service. The communications module 51 may include a wired and/or wireless transceiver. In some cases, the communications module 51 may communicate using cellular communication, WiFi communication, Bluetooth communication, Zigbee communication, WiMax communication, and/or any other suitable communication protocol or system as desired. It is contemplated that the memory 50 may be a non-transitory computer-readable storage medium, and in some cases a non-volatile memory.

In some cases, the memory 50 may be configured to store an executable program, as well as information pertaining to a geofence that is assigned to a building that is associated with the mobile device 14. In some instances, the memory 50 may also store a geofence log that logs one or more detected geofence crossing events. In some cases, the controller 52 may be configured to upload the geofence log to a remote server, such as the building automation server 26 (FIGS. 2 and 3) from time to time, upon request, or in response to a detected event.

In some instances, with the aid of the location services 53, the controller 52 of the mobile device 14 may detect a geofence crossing when the mobile device 14 crosses a geofence that is assigned to the building associated with the mobile device 14. If a geofence crossing is detected, the mobile device 14 may transmit a geofence crossing event to a remote location, such as a remote building automation server 26, via a transmitter of the communications module 51. The size of the geofence that is assigned to the building may be automatically adjusted if a predetermined abnormality is suspected and/or found in the detected geofence crossing events. In some cases, the geofence crossing events may be analyzed by the mobile device 14, a remote server such as the building automation server 26 and/or other device(s) to determine if a predetermined abnormality is suspected. In some cases, a query may be provide to the user via the user interface 48 of the mobile device 14 to verify with the use the presence of the predetermined abnormality before the size of the geofence is automatically adjusted. In some instances, such functionality may be programmed into the mobile device by an executable program stored on the memory 50.

Figure 5:
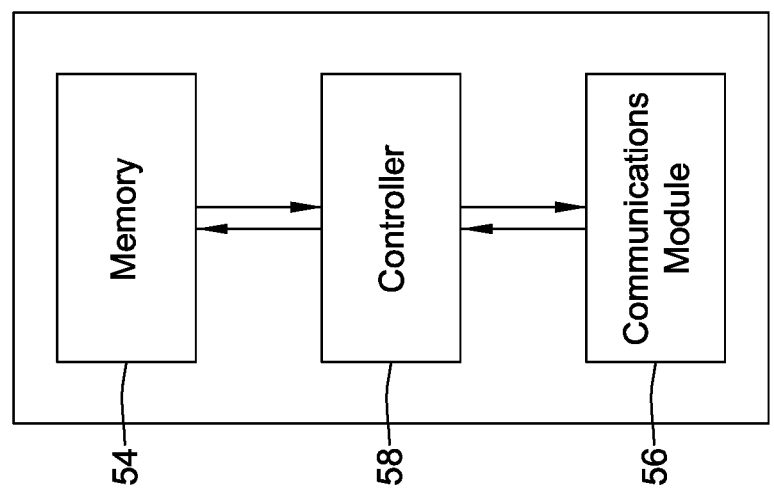
FIG. 5 is a schematic view of an illustrative building automation server.

FIG. 5 is a schematic view of an illustrative building automation server 26, as previously referenced in FIGS. 2 and 3. The building automation server 26 may be configured for servicing a user's building and, in some cases, other buildings as well. The building automation server 26 may include a memory 54, a communications module 56 and a controller 58 that is operably coupled to the memory 54 and to the communications module 56. The memory 54 may be configured for storing a geofence that defines a region about a user's building and, in some cases, a log of geofence crossing events received from the user's mobile device. The memory may be RAM memory, optical storage, hard disk storage, and/or any other suitable memory.

The communications module 56 may be configured to communicate with the user's mobile device 14. For example, the communications module 56 may receive geofence crossing events from a user's mobile device 14. In some cases, a geofence crossing event includes a geofence crossing type of inbound or outbound, a timestamp, and/or any other suitable information. In some cases, the communications module 56 of the building automation server 26 may also send information to the user's mobile device 14. In some instances, this information may include whether a predetermined abnormality is suspected and/or present in the detected geofence crossing events, an adjusted geofence size, and/or any other suitable information.

The communications module 56 of the building automation server 26 may also be configured to communicate with an HVAC controller that is controlling an HVAC system within the user's building. The building automation server 26 may send one or more commands to the HVAC controller such that the HVAC controller controls the HVAC system based at least in part in accordance with the detected geofence crossing events. For example, the building automation server 26 may send a command that causes the HVAC controller to enter a more energy efficient away mode (e.g. unoccupied mode) when an outbound geofence crossing event is detected and to enter a more comfortable home mode (e.g. occupied mode) when an inbound geofence crossing event is detected. This is just one example, In some cases, the mobile device 14 (see FIG. 4) may be configured to store the geofence associated with the building, and to identify when the mobile device 14 crosses the geofence. The communications module 56 of the building automation server 26 may be configured to receive the indications of the geofence crossing events from the mobile device 14 and store them in the memory 54, sometimes in a geofence crossing log. In some cases, the memory 54 may be configured to store a plurality of logs each associated with a corresponding mobile device 14, and the controller 58 may be configured to analyze the plurality of logs to determine if a predetermined abnormality is suspected and/or present. If a predetermined abnormality is suspected and/or present, the controller 58 may communicate the suspected abnormality to the mobile device via the communications module 56. Alternatively, or in addition, some or all of the geofence crossing events may be analyzed by the mobile device 14 rather than the building automation server 26.

In some instances, the mobile device 14 may execute an executable program stored in memory 50 that is configured to instruct the mobile device 14 to store information pertaining to a geofence defined by a size about a location and, with the aid of the location services 53 of the mobile device 14, to detect a geofence crossing when the mobile device 14 crosses the geofence. If a geofence crossing is detected, the executable program may instruct the mobile device 14 to transmit a geofence crossing event to a remote location such as a remote building automation server 26 via a transmitter of a communications module 51 of the mobile device 14. In some cases, the executable program may automatically adjust the size of the geofence if a predetermined abnormality is suspected and/or present in the detected geofence crossing events.

In some instances, the executable program may instruct the mobile device 14 to display a query on the display 49 of the user interface 48 of the mobile device 14 if a predetermined abnormality is suspected and/or present in the detected geofence crossing events. The query may solicit information from the user of the mobile device 14 regarding the predetermined abnormality that is suspected and/or present in the detected geofence crossing events. The executable program may be configured to accept a response to the displayed query via the user interface 48 of the mobile device 14, and then adjust the size of the geofence or not adjust the size of the geofence depending on the accepted response to the displayed query.

The executable program may further instruct the mobile device 14 to display a query on the display 49 of the user interface 48 of the mobile device 14 that queries the user as to whether the user has noticed detected geofence crossing events while the user's remained at home. In some cases, the executable program may instruct the mobile device 14 to accept a user response to the displayed query and, if the user response indicates that the user has noticed detected geofence crossing events while the user's remained at home, to increase the size of the geofence. In some cases, the query is displayed on the display in response to a user selecting a geofence troubleshooting menu option.

In some instances, the executable program may display a query on the display 49 of the user interface 48 of the mobile device 14 that queries the user as to whether the user has noticed a lack of detected geofence crossing events when the user leaves the home. The executable program may further instruct the mobile device 14 to accept a user response to the displayed query and, if the user response indicates that the user has noticed a lack of detected geofence crossing events when the user leaves the home, to decrease the size of the geofence. In some cases, the query is displayed on the display in response to a user selecting a geofence troubleshooting menu option.

It is contemplated that the executable program may, in some cases, be an "application program". The "application program" may initially be stored in a non-transitory computer-readable storage memory of a download server, and then downloaded by the user from the download server to the memory 50 of the mobile device 14. The download server may be, for example, the iTunes™ App Store, the Android™ App Store, a designated server 12 in the cloud (see FIG. 1), a building automation server 26 (see FIGS. 2-3), and/or any other suitable download server. In some cases, the application program may be pre-loaded on the mobile device 14 and/or may be part of the operating system of the mobile device 14, as desired.

In some cases, the executable program may instruct the mobile device 14 to determine if the predetermined abnormality is suspected and/or present in the detected geofence crossing events. In other instances, a remote server may determine if the predetermined abnormality is suspected and/or present in the detected geofence crossing events, and the mobile device simply receives from the remote server whether the predetermined abnormality is suspected and/or present in the detected geofence crossing events.

In some cases, the predetermined abnormality may be the detection of more than a threshold number of geofence crossing events within a predetermined period of time. For example, a predetermined abnormality may be detected if the mobile phone 14 detects more than one geofence crossing event in less than 2 minutes of elapse time, more than three geofence crossing events in less than 10 minutes of elapse time, and/or more than five geofence crossing events in less than 30 minutes of elapse time. In another example, a predetermined abnormality may be detected if more than a threshold number of geofence crossing events are detected during a certain part of a day, such as more than two geofence crossing events during the time period of 1 AM-4 AM. In yet another example, a predetermined abnormality may be detected if no geofence crossing events are detected when the mobile device travels to and remains at a location remote from the user's home for at least a predetermined length of time. These are just some examples of predetermined abnormalities.

FIG. 6 shows an illustrative geofence crossing event log that corresponds to a particular mobile device 14. The illustrative geofence crossing event log includes a log of all detected inbound and outbound geofence crossing events of the mobile device 14. The illustrative geofence crossing event log includes a trigger column, which in the example shown identifies each event as a "FenceCrossed" event. The "Device Token" column identifies the ID (e.g. MAC address) of the particular mobile device 14 that caused the trigger. The "Phone Timestamp" column contains a time stamp applied by the mobile device 14 to each trigger. The "Phone Direction" column identifies whether the corresponding geofence crossing event was an inbound or arrival fence crossing event (e.g. moving from outside of the geofence and crossing into the geofence) or an outbound or departing fence crossing event (e.g. moving from inside the geofence and crossing out of the geofence), as reported by the mobile device 14.

The illustrative geofence crossing event log of FIG. 6 is representative of an event log generated using the building automation system 20 of FIG. 2. As discussed with respect to FIG. 2, the first server 22 (Server1) may be configured to receive data from the mobile device 14, process the data, and send data to the second server 24 (Server2). The second server 24 (Server2) may be configured to communicate with a building controller 16. With respect to the log shown in FIG. 6, the mobile device 14, with the aid of the location services 53 of the mobile device 14, may detect the geofence crossing events listed in the log as the mobile device 14 crosses the geofence. When a geofence crossing is detected, the mobile device 14 may transmit a geofence crossing event, or a "FenceCrossed" trigger, to the first server 22 (Server1). The first server 22 (Server1) may time stamp the reception of the geofence crossing event from the mobile device 14, and record this timestamp as "Server1 Timestamp" in the log. The first server 22 (Server1) may also time stamp the geofence crossing event after it is processed and stored by the first server 22 (Server1). This timestamp may be recorded as "Server1 Received" in the log. The first server 22 (Server1) may also record whether the geofence crossing event is an inbound or arrival fence crossing event (e.g. moving from outside of the geofence and crossing into the geofence) or an outbound or departing fence crossing event (e.g. moving from inside the geofence and crossing out of the geofence). This is recorded in the illustrative log as "Server1 Direction".

In the example shown in FIG. 5, the first server 22 (Server1) may then transmit the geofence crossing event to the second server 24 (Server2). A successful transmission to the second server 24 (Server2) is recorded in the "Server1>Server2" column of the log. The second server 24 (Server2) may then send an instruction to the building controller 16, or in this case, a thermostat (STAT). The instruction may, for example, set a temperature set point of the thermostat (STAT) to a more comfortable setting when the geofence crossing event is an inbound or arrival fence crossing event and may set the temperature set point of the thermostat to a more energy efficient setting when the geofence crossing event is an outbound or depart fence crossing event. A successful transfer of the instruction to the thermostat (STAT) is recorded in the "Server2>STAT" column of the log.

It is contemplated that the log shown in FIG. 6 can be analyzed to determine if one or more predetermined abnormalities are suspected and/or present in the detected geofence crossing events. In one example, a predetermined abnormality may correspond to more than a threshold number of detected geofence crossing events within a predetermined period of time. In the example log of FIG. 6, six alternating "arrive" and "depart" geofence crossing events have occurred in less than one half hour (see "Phone Timestamp" column). In some cases, this may be flagged as a predetermined abnormality by the system. This and/or other predetermined abnormalities may be searched for by the system. It is contemplated that the building automation server 26 may be configured to analyze the log to determine if one or more predetermined abnormalities are suspected and/or present. If a predetermined abnormality is suspected, the building automation server 26 may communicate the suspected abnormality to the mobile device 14. Alternatively, or in addition, some or all of the geofence crossing events in the log may be analyzed by the mobile device 14 rather than the building automation server 26.

Figure 7:
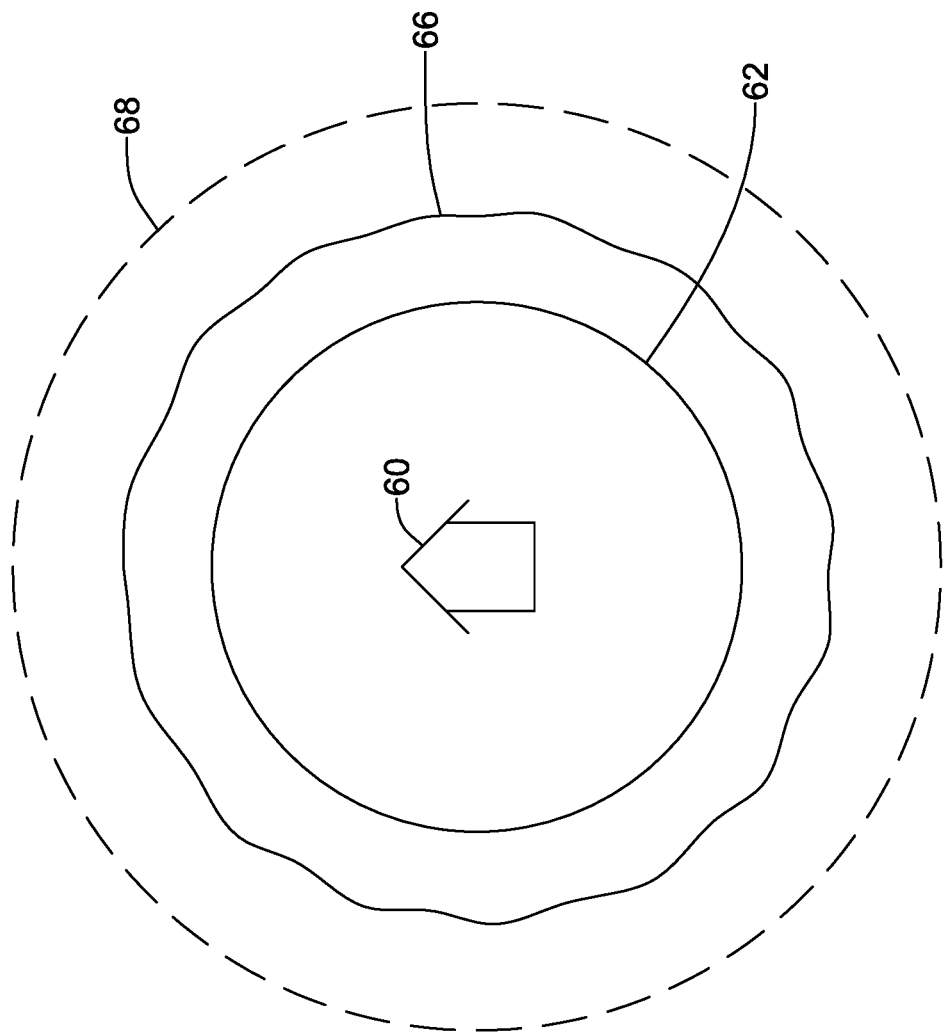
FIG. 7 is a schematic view of an example geofence resizing scenario.

FIG. 7 is a schematic view of an example geofence resizing scenario. In FIG. 7, a geofence 62 is defined about a user's home 60. In the example shown, the home may be in a rural area and the location services of the mobile device 14 may be using cellular triangulation. In rural areas, the cellular towers may be spaced such that the reported location of the mobile device 14 has a significant variability. For example, in FIG. 7, the expected variability of the location reading is represented by region 66. As can be seen, region 66 extends outside of geofence 62. As such, when the mobile device 14 remains within the home 60, the location services of the mobile device 14 may report from time to time that the mobile phone is outside of the geofence 62 when in fact it is not. Thus, a predetermined abnormality may be defined as more than a threshold number of detected geofence crossing events while the mobile device 14 remains in the user's home 60. When such a predetermined abnormality is detected, the size of the geofence may be increased to an enlarged geofence 68. The sized of the enlarged geofence 68 may be set in order to accommodate the relatively high variability in the reported location of the location services of the mobile device 14. If the accuracy of the location services of the mobile device 14 improves, such as by switching from cellular triangulation to GPS in a rural area where cellular triangulation may not be very accurate, the size of the enlarged geofence 68 may be decreased to geofence 62 or smaller.

In some cases, the geofence may be enlarged automatically with no user input. In other cases, a query may first be provided to the user to verify the presence of the predetermined abnormality before the size of the geofence is automatically adjusted to the enlarged geofence 68. One such query is shown in FIG. 8. FIG. 8 is an illustrative screen shot of a mobile device 14 that shows a query that asks the user "Have you noticed that geofence events are triggering while you remain at home?" If the user selects "Yes", the geofence may be automatically enlarged (e.g. to a size determined by the system), and, if the user selects "No", the geofence may not be enlarged but the geofence activity may continue to be monitored.

Figure 9:
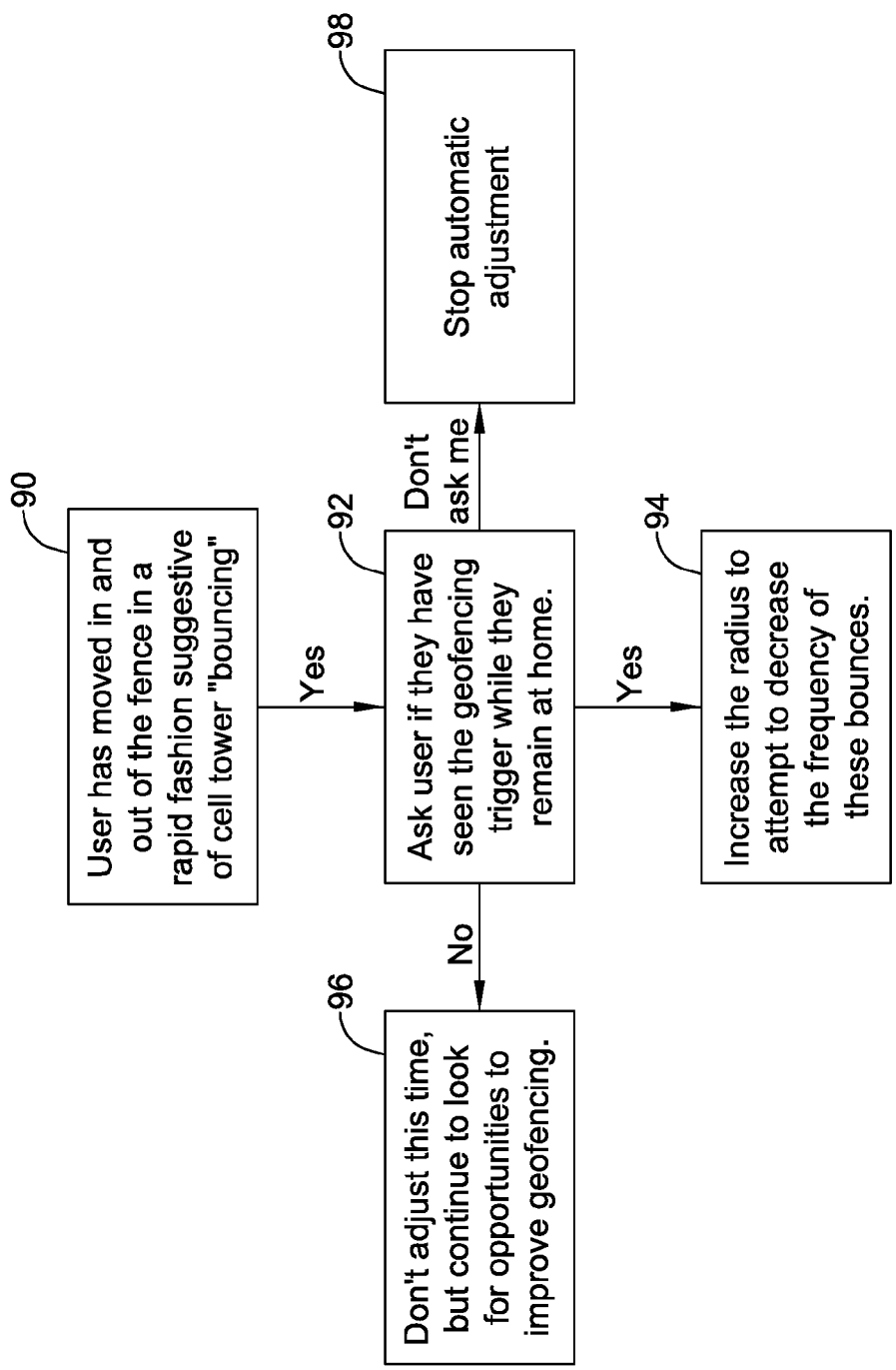
FIG. 9 is a flow chart showing an illustrative method for adjusting the size of the geofence.

FIG. 9 is a flow chart showing an illustrative method for adjusting the size of the geofence. In FIG. 9, it is determined that geofence crossing events have occurred in a rapid fashion suggestive of a high variability in the reported location relative to the geofence size (sometimes due to cell tower bouncing), as shown at 90. At 92, a query may be provided to the user via the mobile device 14 that asks the user if the user has noticed geofencing triggering events while they remained at home. If the user's response is "No", at 96, the system may not increase the size of the geofence to the enlarged geofence 68, but may still look for opportunities to improve the geofencing experience. Referring back to 92, if the user's response is "Yes", the system may automatically increase the radius of the geofence (e.g. to a size determined by the system) in an attempt to decrease the frequency of abnormal geofence crossing events, as shown at 94. Referring back to 92, if the user responds with "Don't ask me again", the system may stop automatic adjustment of the geofence as shown at 98.

Figure 10:
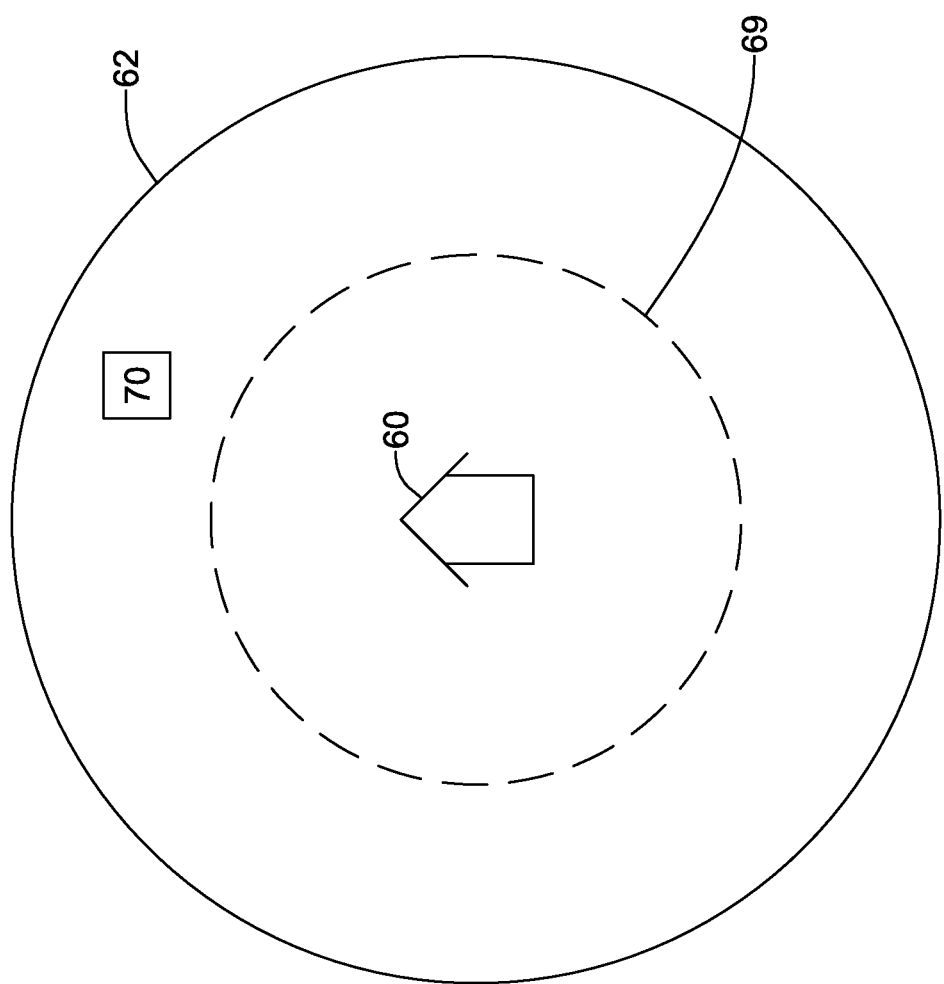
FIG. 10 is a schematic view of another example geofence resizing scenario.

FIG. 10 is a schematic view of another example geofence resizing scenario. In FIG. 10, a geofence 62 is defined about a user's home 60. In this scenario, the user travels to another location 70, such as a place of employment, and no geofence crossings is detected. In the example shown, this is because the place of employment is within the geofence 62 that is defined about the user's home 60. The system may recognize that the user has traveled from the user's home 60 to another location 70 that is within the geofence 62 and stayed at that location for an extended period of time (e.g. greater than 2 hours). The system may identify this as a predetermined abnormality and may automatically reduce the size of the geofence 62 to a reduced-size geofence 69. In some cases, the geofence size may be automatically reduced with no user input. In other cases, a query may first be provided to the user to verify the presence of the predetermined abnormality before the size of the geofence is automatically adjusted to the reduced geofence 69.

Figure 11:
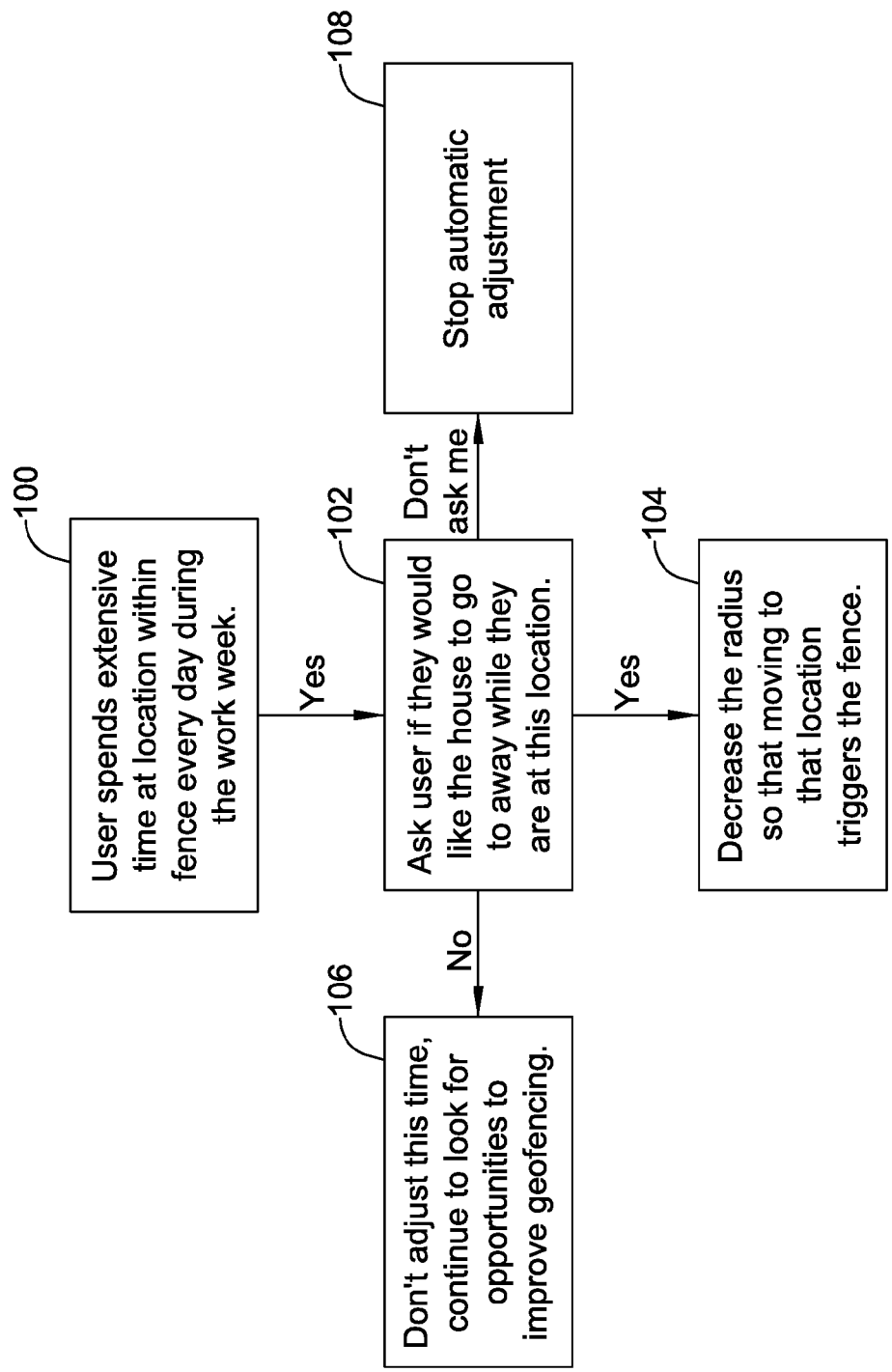
FIG. 11 is a flow chart showing another illustrative method for adjusting the size of the geofence.

FIG. 11 is a flow chart showing another illustrative method for adjusting the size of the geofence. In FIG. 11, it is determined that the user spends extensive time at a location within the geofence 62 every day during the work week, as shown at 100. Alternatively, or in addition, it may be determined that the user travels to another location 70 within the geofence 62 and stays at that location for more than a predetermined amount of time on a regular basis. These are just some examples. At 102, a query may be provided to the user via the mobile device 14 that asks the user if they would like the house to enter an energy savings away mode while they are at the location 70. If the user's response is "No" at 106, the system may not decrease the size of the geofence, but may still look for opportunities to improve the geofencing experience. Referring back to 102, if the user's response is "Yes", the system may automatically decrease the radius of the geofence to trigger a geofence crossing event when moving from the home 60 to that location 70, as shown at 104. Referring back to 102, if the user responds with "Don't ask me again", the system may stop automatic adjustment of the geofence as shown at 108.

Figure 12:
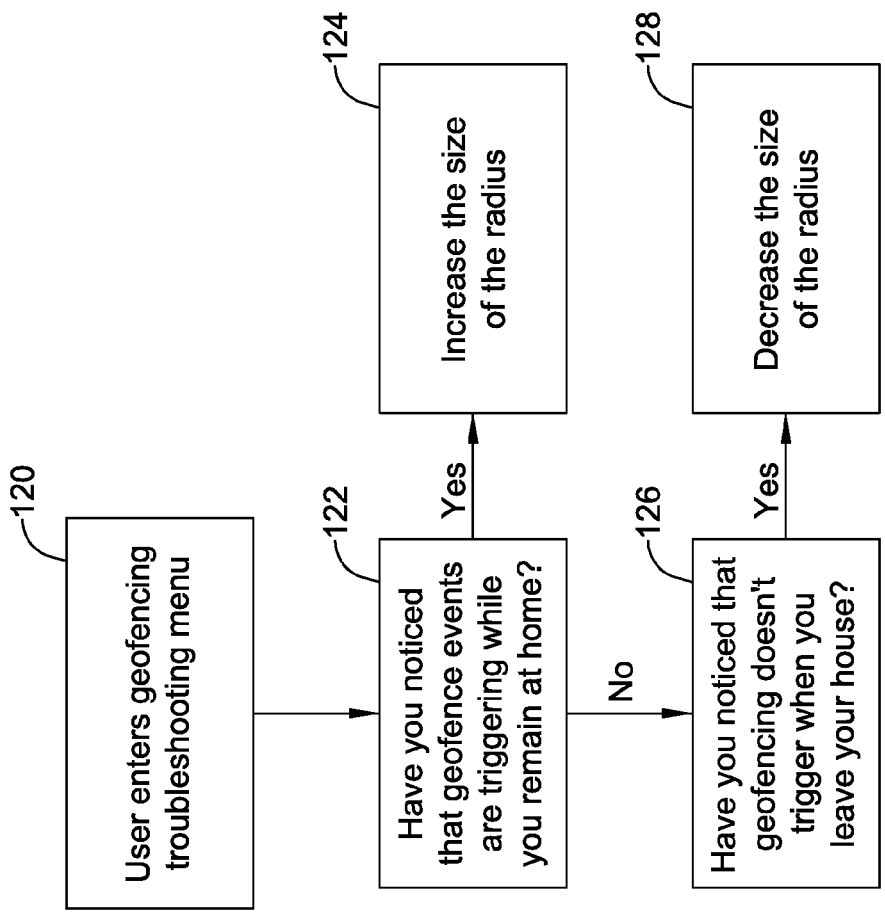
FIG. 12 is a flow chart showing another illustrative method for adjusting the size of the geofence.

FIG. 12 is a flow chart showing another illustrative method for adjusting the size of the geofence. In FIG. 12, and at 120, the user may enter a troubleshooting menu or mode via the user interface of the mobile device 14. Once in the troubleshooting menu or mode, and at 122, a query may be provide to the user via the mobile device 14 that asks the user if they have noticed geofencing triggering events while they remained at home. If yes, and at 124, the system may automatically increase the radius of the geofence (e.g. to a size determined by the system) in an attempt to decrease the frequency of these abnormal geofence crossing events. Referring back to 122, if the user has not noticed geofencing triggering events while remaining at home, the system may ask the user if they have noticed geofencing does not trigger when they leave the house, as shown at 126. If so, and at 128, the system may automatically decrease the size of the geofence (e.g. to a size determined by the system).

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A non-transitory computer-readable storage medium with an executable program stored thereon, wherein the executable program is configured to instruct a mobile device, having a user interface with a display and location services, to perform the following:
   store information pertaining to a geofence, the geofence defined by a size about a building;
   with the aid of the location services of the mobile device, detect a geofence crossing when the mobile device crosses the geofence, and if a geofence crossing is detected, transmit a corresponding geofence crossing event to a remote location via a transmitter of the mobile device, wherein the geofence crossing event is used in controlling a building controller of the building;
   display a query on the display of the user interface of the mobile device if a predetermined abnormality is suspected and/or present in the detected geofence crossing events, the query soliciting information from a user of the mobile device regarding the predetermined abnormality that is suspected and/or present in the detected geofence crossing events;
   accept a response to the displayed query via the user interface of the mobile device; and
   adjust the size of the geofence or do not adjust the size of the geofence, depending on the accepted response to the displayed query.

2. The non-transitory computer-readable storage medium of claim 1, wherein the executable program instructs the mobile device to determine if the predetermined abnormality is suspected and/or present in the detected geofence crossing events.

3. The non-transitory computer-readable storage medium of claim 1, wherein the executable program instructs the mobile device to receive via a receiver of the mobile device if the predetermined abnormality is suspected and/or present in the detected geofence crossing events.

4. The non-transitory computer-readable storage medium of claim 3, wherein a remote server determines if the predetermined abnormality is suspected and/or present in the detected geofence crossing events, and the mobile device receives from the remote server whether the predetermined abnormality is suspected and/or present in the detected geofence crossing events.

5. The non-transitory computer-readable storage medium of claim 1, wherein the predetermined abnormality comprises more than a threshold number of detected geofence crossing events within a predetermined period of time.

6. The non-transitory computer-readable storage medium of claim 1, wherein the predetermined abnormality comprises more than a threshold number of detected geofence crossing events during a predefined period of time during a day.

7. The non-transitory computer-readable storage medium of claim 1, wherein the building corresponds to the user's home, and wherein the predetermined abnormality is no detected geofence crossing events even when the mobile device travels to and remains at a location remote from the user's home for at least a predetermined length of time.

8. The non-transitory computer-readable storage medium of claim 1, wherein the location is set to the location of the user's home, and wherein the predetermined abnormality is one or more detected geofence crossing events while the mobile device remains at home.

9. The non-transitory computer-readable storage medium of claim 1, wherein the location services of the mobile device comprises cellular triangulation.

10. The non-transitory computer-readable storage medium of claim 1, wherein the location services of the mobile device comprises GPS.

11. A non-transitory computer-readable storage medium with an executable program stored thereon, wherein the executable program is configured to instruct a mobile device, having a user interface with a display and location services, to perform the following:
    store information pertaining to a geofence, the geofence defined by a size about a building;
    with the aid of the location services of the mobile device, detect a geofence crossing when the mobile device crosses the geofence, and if a geofence crossing is detected, transmit a corresponding geofence crossing event to a remote location via a transmitter of the mobile device, wherein the geofence crossing event is used in controlling a building controller of the building; and automatically adjust the size of the geofence if a predetermined abnormality is suspected and/or present in the detected geofence crossing events.

12. The non-transitory computer-readable storage medium of claim 11, wherein the executable program instructs the mobile device to determine if the predetermined abnormality is suspected and/or present in the detected geofence crossing events.

13. The non-transitory computer-readable storage medium of claim 11, wherein the executable program instructs the mobile device to receive via a receiver of the mobile device if the predetermined abnormality is suspected and/or present in the detected geofence crossing events.

14. The non-transitory computer-readable storage medium of claim 11, wherein the predetermined abnormality comprises more than a threshold number of detected geofence crossing events within a predetermined period of time.

15. The non-transitory computer-readable storage medium of claim 11, wherein the building corresponds to the user's home, and wherein the predetermined abnormality comprises more than a threshold number of detected geofence crossing events even while the mobile device remains in the user's home.

16. The non-transitory computer-readable storage medium of claim 11, wherein the building corresponds to the user's home, and wherein the predetermined abnormality is no detected geofence crossing events even when the mobile device travels to and remains at a location remote from the user's location for at least a predetermined length of time.

17. The non-transitory computer-readable storage medium of claim 11, wherein the location services of the mobile device comprises cellular triangulation.

18. The non-transitory computer-readable storage medium of claim 11, wherein the location services of the mobile device comprises GPS.

19. A non-transitory computer-readable storage medium with an executable program stored thereon, wherein the executable program is configured to instruct a mobile device, having a user interface with a display and location services, to perform the following:
- store information pertaining to a geofence, the geofence defined by a size about a building;
- with the aid of the location services of the mobile device, detect a geofence crossing when the mobile device crosses the geofence, and if a geofence crossing is detected, transmit over a network a corresponding geofence crossing event via a transmitter of the mobile device, wherein the geofence crossing event is used in controlling a building controller of the building;
- display a query on the display of the user interface of the mobile device that queries a user of the mobile device whether the user has noticed detected geofence crossing events while the user's remained at the building;
- accept a user response to the displayed query; and
- if the user response indicates that the user has noticed detected geofence crossing events while the user's remained at the building, increase the size of the geofence.

20. The non-transitory computer-readable storage medium of claim 19, further comprising:
- display a query on the display of the user interface of the mobile device that queries the user as to whether the user has noticed a lack of detected geofence crossing events when the user leaves the building;
- accept a user response to the displayed query; and
- if the user response indicates that the user has noticed a lack of detected geofence crossing events when the user leaves the building, decrease the size of the geofence.

* * * * *